(12) United States Patent
Bray et al.

(10) Patent No.: US 12,434,450 B2
(45) Date of Patent: Oct. 7, 2025

(54) BLADDER VENT PLUGS FOR COMPOSITE MANUFACTURING AND RELATED METHODS AND SYSTEMS

(71) Applicant: The Boeing Company, Arlington, VA (US)

(72) Inventors: Keegan D. Bray, Federal Way, WA (US); Wesley E. Perrault, Snohomish, WA (US); Shuonan Dong, Seattle, WA (US); Daniel J. McMillan, Edmonds, WA (US); Asher S. Einhorn, Seattle, WA (US); Samuel B. Williams, Mount Vernon, WA (US); Zena L. Moran, Everett, WA (US); Jonathan A. Santiago, Seattle, WA (US)

(73) Assignee: The Boeing Company, Arlington, VA (US)

( * ) Notice: Subject to any disclaimer, the term of this patent is extended or adjusted under 35 U.S.C. 154(b) by 123 days.

(21) Appl. No.: 18/542,397

(22) Filed: Dec. 15, 2023

(65) Prior Publication Data

US 2025/0196453 A1 Jun. 19, 2025

(51) Int. Cl.
*B29C 70/54* (2006.01)
*B29C 33/10* (2006.01)
*B29C 33/50* (2006.01)
*B29C 70/44* (2006.01)

(52) U.S. Cl.
CPC ............ *B29C 70/544* (2021.05); *B29C 33/10* (2013.01); *B29C 33/505* (2013.01); *B29C 70/44* (2013.01)

(58) Field of Classification Search
None
See application file for complete search history.

(56) References Cited

U.S. PATENT DOCUMENTS

| | | | |
|---|---|---|---|
| 5,353,842 A * | 10/1994 | Lundman | F16L 55/134 138/93 |
| 5,576,030 A | 11/1996 | Hooper | |
| 6,918,985 B2 | 7/2005 | Geyer | |
| 8,684,343 B2 | 4/2014 | Hiken et al. | |
| 2019/0210304 A1 | 7/2019 | Wallace | |
| 2021/0023799 A1 | 1/2021 | Santoni | |

FOREIGN PATENT DOCUMENTS

EP 2623302 A1 8/2013

* cited by examiner

*Primary Examiner* — Barbara J Musser
(74) *Attorney, Agent, or Firm* — Kolitch Romano Dascenzo Gates LLC

(57) ABSTRACT

Bladder vent plugs comprise a body, a manifold block, and a diaphragm extending fully around a peripheral channel of the manifold block. The diaphragm is configured to expand toward an interior-volume peripheral face of the body when the peripheral channel is pressurized via a pressure bore extending through the manifold block and a pressure passage extending through the body. Bladder vent plugs are configured to receive an open-ended composite-manufacturing bladder between the interior-volume peripheral face and the peripheral channel of the manifold block. Composite manufacturing methods comprise pressurizing a diaphragm to seal an open-ended composite-manufacturing bladder against a bladder vent plug.

21 Claims, 11 Drawing Sheets

BLADDER VENT PLUGS FOR COMPOSITE MANUFACTURING AND RELATED METHODS AND SYSTEMS

FIELD

The present disclosure relates to composite manufacturing.

BACKGROUND

Stiffened composite structures are structures that are constructed of composite materials, such as fiber reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage and stringers that extend longitudinally along the inside of the fuselage and that are spaced circumferentially around the inside of the fuselage. Similarly, aircraft wings may be constructed as stiffened composite structures with a skin operatively coupled to stringers and spars that run span-wise along the wings and ribs that run chord-wise across the wings. Such stiffened composite structures may be constructed utilizing inner mold line layup mandrels, or tools, that define the inside surfaces of a structure being manufactured or utilizing outer mold line layup mandrels, or tools, that define the outside surfaces of a structure being manufactured. Typical stringers, such as hat-shaped stringers, define cavities, with these cavities needing to be filled with a structure that will result in a flush surface to which the skin may be applied. These filler structures often are referred to as stringer mandrels or stringer bladders. Some stringer bladders are solid and made of a rubber or similar material. Other stringer bladders are hollow. Once stringer bladders are operatively positioned within a cavity between stringers and the skin, the stringers and the skin are vacuum-compacted and co-cured in an autoclave. The vacuum compacting process utilizes a flexible sheet of material and sometimes caul plates that collectively extend across the stringers and skin and are sealed to the layup mandrel around the outer perimeter of the stringers and skin. A vacuum is then applied between the sheet of material and the inner mold line layup mandrel to compact the stringers and skin together. When hollow stringer bladders are used, the internal volumes of the stringer bladders must be isolated from the vacuum and fluidically open to atmosphere to avoid the string bladders collapsing during the vacuum compacting process. This vacuum compacting process is referred to in the aerospace industry as "bagging" and is labor, time, and material intensive. In particular, the integrity of the seal between the flexible sheet of material and the layup mandrel is critical. Conventionally, the sheet of material, or "bag," is perforated (or penetrated) by the vent lines that are connected to the internal volumes of the stringer bladders, resulting in numerous potential leak points and excessive use of one-time use materials.

SUMMARY

Bladder vent plugs for composite manufacturing and related methods and systems are disclosed herein. Bladder vent plugs comprise a body, a manifold block, and a diaphragm. The body defines an interior volume, a vent passage that extends through the body from the interior volume, and a pressure passage that extends through the body from the interior volume. The body comprises an interior-volume end face and an interior-volume peripheral face that collectively define the interior volume, and the vent passage and the pressure passage extend through the interior-volume end face. The manifold block is positioned within the interior volume of the body, defines a throughbore that is aligned with the vent passage, a peripheral channel that faces the interior-volume peripheral face, and a pressure bore that is aligned with the pressure passage and that is open to the peripheral channel. The diaphragm is operatively positioned relative to the peripheral channel, extends fully around the peripheral channel, and is configured to expand toward the interior-volume peripheral face when the peripheral channel is pressurized via the pressure bore and the pressure passage. The bladder vent plug is configured to receive an open-ended composite-manufacturing bladder between the interior-volume peripheral face and the peripheral channel of the manifold block.

Composite manufacturing systems comprise a bladder vent plug, a layup tool, an open-ended composite-manufacturing bladder, and a composite manufacturing bag.

Composite manufacturing methods comprise pressurizing a diaphragm to seal an open-ended composite-manufacturing bladder against a bladder vent plug.

DESCRIPTION

Figure 1:
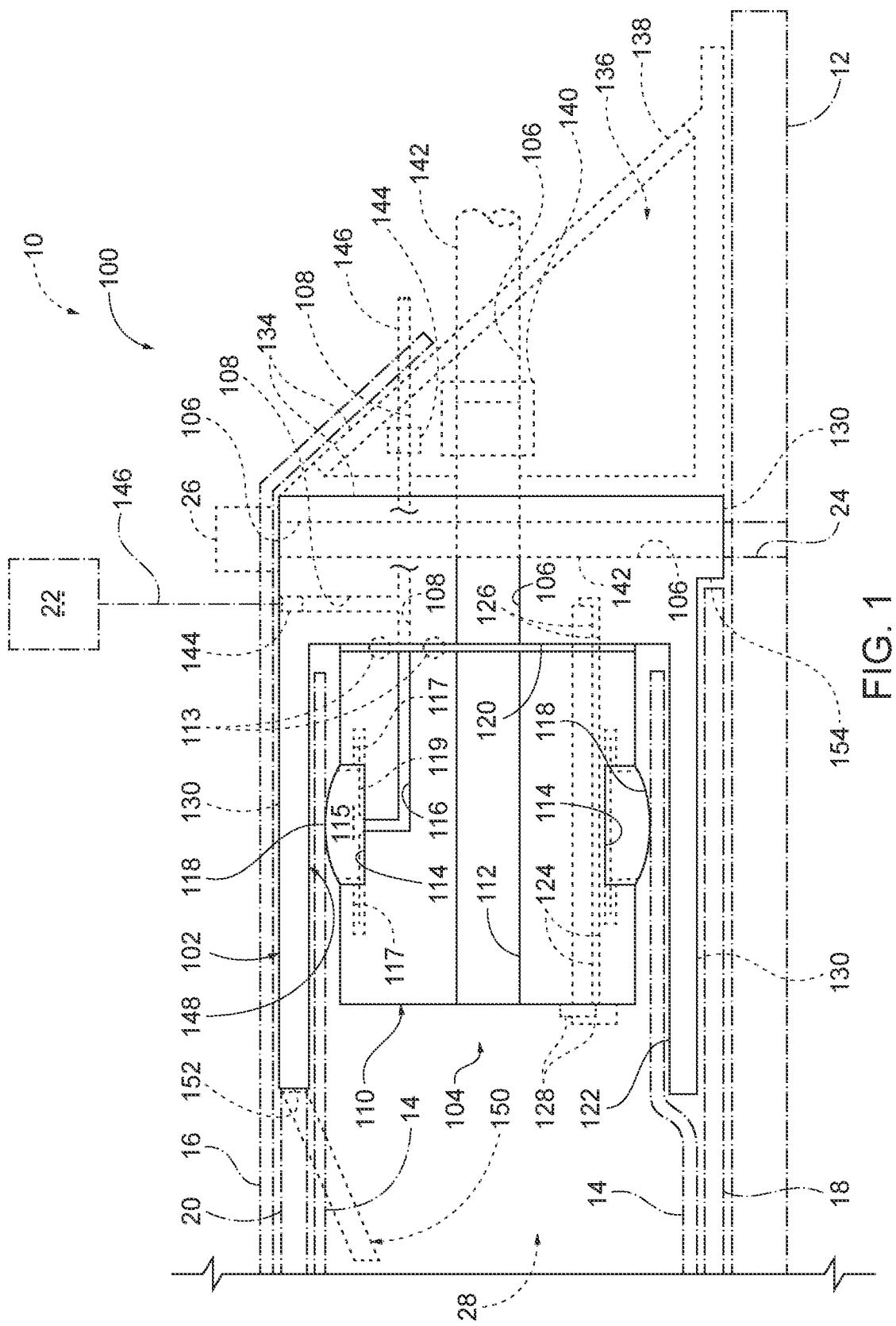
FIG. 1 is a schematic illustration representing bladder vent plugs and composite manufacturing systems according to the present disclosure.

Bladder vent plugs 100 for composite manufacturing and composite manufacturing systems 10 are disclosed herein and schematically represented in FIG. 1. Generally, in FIG. 1, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

As discussed above, when hollow bladders, such as stringer bladders, are used in composite manufacturing, the internal volumes of the hollow bladders must be isolated from the vacuum and fluidically open to the surrounding environment (i.e., outside of the bagged environment being vacuumed) to avoid the stringer bladders collapsing during the vacuum compacting process. Bladder vent plugs are used to plug the open end of the hollow bladders, while providing a fluid pathway for venting the internal volume to the surrounding environment.

As schematically represented in FIG. 1, bladder vent plugs 100 according to the present disclosure comprise at least a body 102, a manifold block 110, and a diaphragm 118. The body 102 defines an interior volume 104, a vent passage 106 that extends through the body 102 from the interior volume 104, and a pressure passage 108 that extends through the body 102 from the interior volume 104. The body 102 comprises an interior-volume end face 120 and an interior-volume peripheral face 122 that collectively define the interior volume 104. The vent passage 106 and the pressure passage 108 extend through the interior-volume end face 120. The interior volume 104 may be described as an open internal volume that is open to the internal volume of an open-ended composite-manufacturing bladder 14 when a bladder vent plug 100 is operatively installed for use.

The manifold block 110 is positioned within the interior volume 104 of the body 102 and defines a throughbore 112 that is aligned with the vent passage 106. In some examples, as schematically represented in FIG. 1, a seal 113 (e.g., an O-ring or gasket) may be provided between the manifold block 110 and the interior-volume end face 120 of the body 102 around an interface between the throughbore 112 and the vent passage 106.

The manifold block 110 also defines a peripheral channel 114 that faces the interior-volume peripheral face 122. The manifold block 110 also defines a pressure bore 116 that is aligned with the pressure passage 108 and that is open to the peripheral channel 114.

The diaphragm 118 is operatively positioned relative to the peripheral channel 114 of the manifold block 110, extends fully around the peripheral channel 114, and is configured to expand toward the interior-volume peripheral face 122 when the peripheral channel 114 is pressurized via the pressure bore 116 and the pressure passage 108.

Bladder vent plugs 100 are configured to receive an open-ended composite-manufacturing bladder 14 between the interior-volume peripheral face 122 and the peripheral channel 114 of the manifold block 110.

Accordingly, when an open-ended composite-manufacturing bladder 14 is operatively positioned between the interior-volume peripheral face 122 and the peripheral channel 114 of the manifold block 110, as schematically represented in FIG. 1, the internal volume of the open-ended composite-manufacturing bladder 14 and the peripheral channel 114 of the manifold block 110 are in fluid communication with the environment outside of the bladder vent plug 100 via the throughbore 112 of the manifold block 110 and the vent passage 106 of the body 102. In addition, when the pressure bore 116 of the manifold block 110 is pressurized via the pressure passage 108 of the body 102, the diaphragm 118 expands into engagement with the open-ended composite-manufacturing bladder 14 to seal the open-ended composite-manufacturing bladder 14 against the interior-volume peripheral face 122. As a result, the only pathway from outside the open-ended composite-manufacturing bladder 14 to and from the internal volume of the open-ended composite-manufacturing bladder 14 is via the throughbore 112 of the manifold block 110 and the vent passage 106 of the body 102.

In some examples, the manifold block 110 is fixedly coupled to, or is configured to be fixedly coupled to, the body 102 within the interior volume 104 of the body 102. In some such examples, and as schematically illustrated in FIG. 1, the manifold block 110 defines one or more manifold-block fastener bores 124 that extend through the manifold block 110, and the body 102 defines one or more body fastener bores 126 that extend through the interior-volume end face 120 and that are aligned with the one or more manifold-block fastener bores 124. The manifold-block fastener bore(s) 124 and the body fastener bore(s) 126 are configured to receive respective fastener(s) 128 to fixedly secure the manifold block 110 to the body 102. In other examples, the manifold block 110 may be integral with the body 102.

The diaphragm 118 may take variety of possible forms and be constructed from a stretchable and resilient material that will operatively expand toward the interior-volume peripheral face 122 when the pressure bore 116 is pressurized via the pressure passage 108. Moreover, the diaphragm 118 remains with the manifold block 110 and is used repeatedly for multiple instances of composite manufacturing. Examples of suitable materials for the diaphragm include rubber, synthetic rubber, and silicone. In some examples of bladder vent plugs 100, and as schematically represented in FIG. 1, the diaphragm 118 defines a tube 119 operatively positioned within the peripheral channel 114 and in fluid communication with the pressure bore 116. In other examples, the diaphragm 118 comprises a sheet of stretchable material that extends across the peripheral channel 114 and that is coupled (e.g., adhered) to the manifold block 110. In yet other examples, the peripheral channel 114 comprises a central region 115 and a pair of lateral slots 117 that extend into the manifold block 110 from the central region 115, and the diaphragm 118 extends into and is secured within the pair of lateral slots 117, as schematically and optionally represented in FIG. 1. Other configurations of diaphragms 118 also may be incorporated into bladder vent plugs 100 and operatively coupled to the manifold block 110.

With continued reference to FIG. 1, in some examples, the body 102 may be described as comprising a peripheral body surface 130 and an end surface 134 opposite the interior volume 104 of the body 102.

In some such examples, the vent passage 106 extends through the peripheral body surface 130. For example, as optionally illustrated in FIG. 1, the vent passage 106 may be configured to be operatively coupled to a vent fitting 26 associated with a composite manufacturing bag 16 when operatively positioned over the bladder vent plug 100. In other examples, the vent passage 106 may be configured to be fluidically connected to a layup-tool vent passage 24 extending through a layup tool 12 on which a composite assembly is being manufactured. By venting the open-ended composite-manufacturing bladder 14 through the layup tool 12, the composite manufacturing bag 16 need not be penetrated with fluid lines, vents, valves, manifolds, and the like for operative venting of the open-ended composite-manufacturing bladder 14.

In some examples, as also schematically and optionally illustrated in FIG. 1, the vent passage 106 extends through the end surface 134 of the body 102. In such a configuration, penetration of the composite manufacturing bag 16 may be avoided, and a layup-tool vent passage 24 may not be required, resulting in an overall less complex composite manufacturing system 10.

Similar to the vent passage 106, in some examples, the pressure passage 108 extends through the peripheral body surface 130 of the body 102, as schematically and optionally represented in FIG. 1. In such examples, the diaphragm 118 will need to be operatively pressurized to seal the open-ended composite-manufacturing bladder 14 against the interior-volume peripheral face 122 prior to operative installation of a composite manufacturing bag 16, or the composite manufacturing bag 16 will need to be configured with an appropriate fitting and/or valve to permit the pressurization of the pressure passage 108 once the composite manufacturing bag 16 is operatively installed. In other examples, as also schematically and optionally represented in FIG. 1, the pressure passage 108 extends through the end surface 134 of the body 102.

In some examples and as schematically and optionally illustrated in FIG. 1, the end surface 134 of the body 102 is skew relative to the peripheral body surface 130. In such examples, the end surface 134 may provide a smooth fairing surface against which a composite manufacturing bag 16 may be sealed.

With continued reference to FIG. 1, in some examples of bladder vent plugs 100, the body 102 defines an access volume 136, and the body 102 comprises an access-volume panel 138 that is configured to provide selective access to the access volume 136. For example, in some examples, the vent passage 106 and/or the pressure passage 108 extend into, or are open, into the access volume 136, where a vent-passage connector 140 and/or a pressure-passage connector 144 may be positioned for operative attachment of a separate vent line 142 and/or a pressure line 146. That is, some bladder vent plugs 100 further comprise a vent-passage connector 140 that is positioned within the access volume 136, that is operatively coupled to the vent passage 106, and that is configured to be selectively and operatively coupled to a separate vent line 142. Similarly, some bladder vent plugs 100 further comprise a pressure-passage connector 144 that is operatively coupled to the pressure passage 108 and that is configured to be selectively and operatively coupled to a pressure source 22 via a pressure line 146.

With continued reference to FIG. 1, in some examples of bladder vent plugs 100, the interior-volume peripheral face 122 of the body 102 may be described as having a diaphragm engagement portion 148, toward which the diaphragm 118 is configured to expand for operative engagement with an open-ended composite-manufacturing bladder 14. In some examples, the diaphragm engagement portion 148 of the interior-volume peripheral face 122 is cylindrical. In such examples, the diaphragm engagement portion 148 provides a smooth surface without sharp edges or corners for engagement and operative sealing of the open-ended composite-manufacturing bladder 14. In some examples and as schematically represented in FIG. 1, the body 102 comprises a transition region 150, within which the interior-volume peripheral face 122 transitions from a non-circular cross-section to a circular cross-section from distal the interior-volume end face 120 toward the diaphragm engagement portion 148. As an example, when an open-ended composite-manufacturing bladder 14 is associated with a hat-shaped stringer, the non-circular cross-section may be generally trapezoidal and then transition to the circular cross-section at the diaphragm engagement portion 148. Such a configuration may avoid wrinkles, kinks, and the like in the open-ended composite-manufacturing bladder 14 at the location of the diaphragm engagement portion 148 of the interior-volume peripheral face 122 so that a good seal is ensured between the open-ended composite-manufacturing bladder 14 and the interior-volume peripheral face 122.

As mentioned, also within the scope of the present disclosure are composite manufacturing systems 10. As schematically represented in FIG. 1, composite manufacturing systems 10 may comprise at least a bladder vent plug 100 according to the present disclosure, a layup tool 12, an open-ended composite-manufacturing bladder 14, and a composite manufacturing bag 16. In some examples, the layup tool 12 defines a layup-tool vent passage 24 that extends through the layup tool 12, and the layup-tool vent passage 24 is configured to be fluidically connected to the vent passage 106 of the bladder vent plug 100. In other examples, the composite manufacturing bag 16 comprises a vent connector 26 that is configured to be fluidically connected to the vent passage 106 of the bladder vent plug 100, such as discussed herein.

During operative use of a composite manufacturing system 10, the open-ended composite-manufacturing bladder 14 is operatively positioned between the interior-volume peripheral face 122 and the diaphragm 118, and the peripheral channel 114 of the manifold block 110 is pressurized so that the diaphragm 118 urges the open-ended composite-manufacturing bladder 14 against the interior-volume peripheral face 122.

As schematically illustrated in FIG. 1, composite manufacturing systems 10 also may be described as comprising a first composite structure 18 (e.g., a layup, a ply stack, etc. defining a skin) that is engaged with the layup tool 12 and a second composite structure 20 (e.g., a layup, a ply stack, etc. defining a stringer) that is engaged with the first composite structure 18. The first composite structure 18 and the second composite structure 20 may define a stringer volume 28, within which the open-ended composite-manufacturing bladder 14 is positioned. The composite manufacturing bag 16 extends over the first composite structure 18 and the second composite structure 20 and is sealed against the layup tool 12 and optionally against the bladder vent plug 100.

With continued reference to FIG. 1, the body 102 of a bladder vent plug 100 may be described as comprising an end face 152 that provides a surface against which a second composite structure 20 (e.g., a stringer) may be abutted during operative use of the bladder vent plug 100. In some examples, the end face 152 is planar and corresponds in shape to the cross-sectional profile of the second composite structure 20. Accordingly, with reference to FIG. 1, the composite manufacturing bag 16 will have a smooth transition from atop the second composite structure 20 to atop the body 102 of the bladder vent plug.

Additionally or alternatively, as schematically represented in FIG. 1, the body 102 of some bladder vent plugs 100 further comprises a mid face 154 that provides a surface against which a first composite structure 18 (e.g., a skin) may be abutted during operative use of the bladder vent plug 100. Accordingly, with reference to FIG. 1, a flat layup tool 12 may be used such that the first composite structure 18 and the body 102 of the bladder vent plug 100 rest atop the layup tool 12 without detriment to the shape and integrity of the first composite structure 18.

Bladder vent plugs 100 thus may be described as providing caul surfaces and/or as an end caul for composite manufacturing systems 10.

Figure 2:
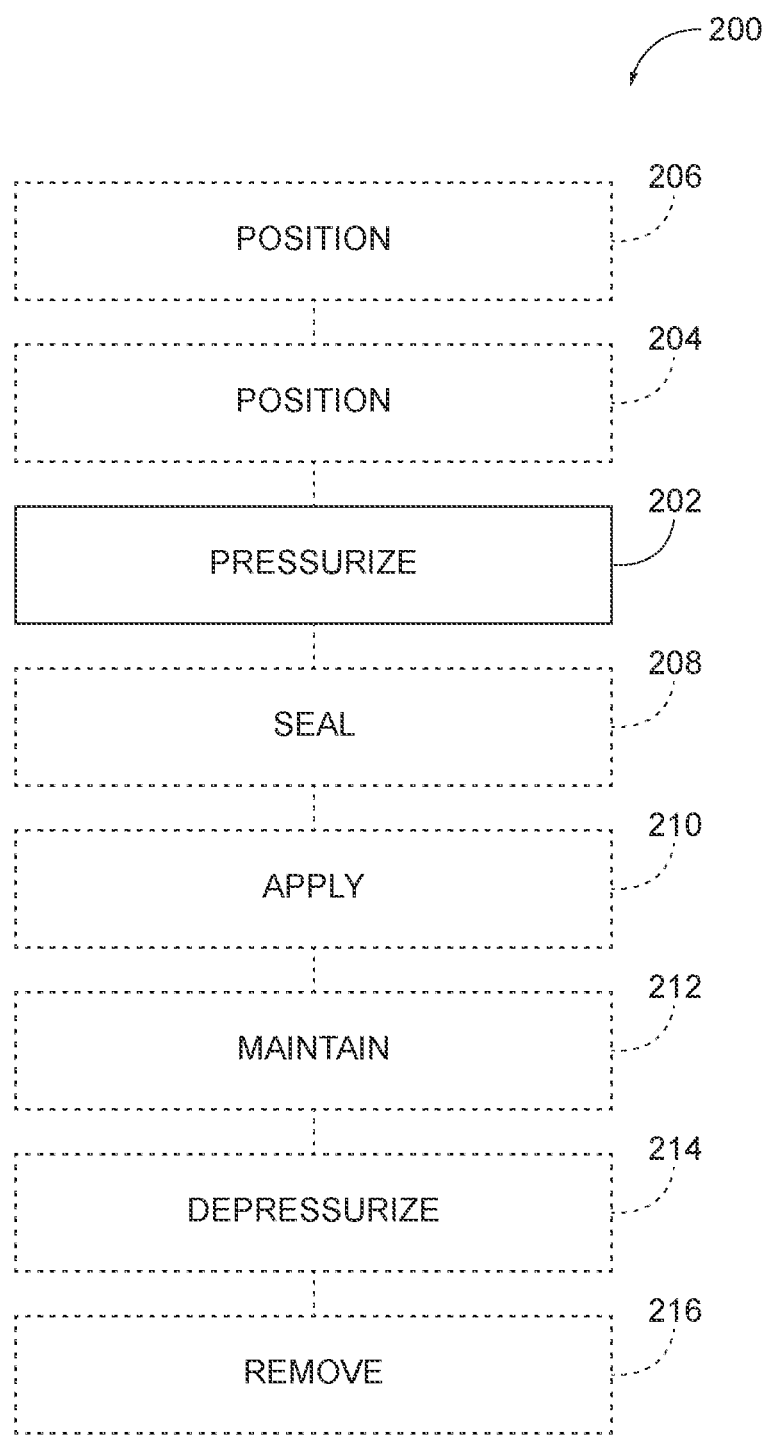
FIG. 2 is a flowchart schematically representing composite manufacturing methods according to the present disclosure.

FIG. 2 schematically provides a flowchart that represents illustrative, non-exclusive examples of composite manufacturing methods 200, for example, that utilize a bladder vent plug 100. In FIG. 2, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 2 are not limiting and other methods and steps are within the scope of the present disclosure, including methods having greater than or fewer than the number of steps illustrated, as understood from the discussions herein.

As schematically illustrated in FIG. 2, composite manufacturing methods 200 comprise at least pressurizing 202 a diaphragm (e.g., a diaphragm 118) to seal an open-ended composite-manufacturing bladder against a bladder vent plug (e.g., a bladder vent plug 100).

As schematically represented in FIG. 2, some methods 200 further comprise, prior to the pressurizing 202, positioning 204 the open-ended composite-manufacturing bladder 14 between the diaphragm 118 and a body 102 of the bladder vent plug 100. In some such examples, the positioning 204 comprises positioning the open-ended composite-manufacturing bladder 14 between a manifold block 110 of the bladder vent plug 100 and the body 102 of the bladder vent plug 100. Additionally or alternatively, in some examples, the positioning 204 further comprises assembling the body 102 of the bladder vent plug 100 around the manifold block 110 of the bladder vent plug 100.

With continued reference to FIG. 2, some examples of methods 200 further comprise, prior to the pressurizing 202, positioning 206 the open-ended composite-manufacturing bladder 14 between a first composite structure 18 and a second composite structure 20 relative to a layup tool 12, and sealing 208 a composite manufacturing bag 16 over the first composite structure 18 and the second composite structure 20 against the layup tool 12. In some such examples, methods 200 further comprise, following the sealing 208, applying 210 a vacuum to the first composite structure 18 and the second composite structure 20 while maintaining 212 fluid communication between an internal volume of the open-ended composite-manufacturing bladder 14 and an environment outside of the vacuum. In some such examples, methods 200 further comprise, following the applying 210, depressurizing 214 the diaphragm 118 and removing 216 the open-ended composite-manufacturing bladder 14 from between the diaphragm 118 and the bladder vent plug 100.

Turning now to FIGS. 3-11, illustrative non-exclusive examples of bladder vent plugs 100 in the form of a bladder vent plug 300 (FIGS. 3-6) and a bladder vent plug 400 (FIGS. 7-11) are illustrated. Where appropriate, the reference numerals from the schematic illustration of FIG. 1 are used to designate corresponding parts of the examples of FIGS. 3-9; however, the examples of FIGS. 3-11 are non-exclusive and do not limit bladder vent plugs 100 to the illustrated embodiments of FIGS. 3-11. That is, bladder vent plugs 100 are not limited to the specific embodiments of FIGS. 3-11, and bladder vent plugs 100 may incorporate any number of the various aspects, configurations, characteristics, properties, etc. of bladder vent plugs 100 that are illustrated in and discussed with reference to the schematic representations of FIG. 1 and/or the embodiments of FIGS. 3-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 3-11; however, it is within the scope of the present disclosure that the previously discussed features, variants, etc. may be utilized with the examples of FIGS. 3-11.

FIGS. 3-6 illustrate the bladder vent plug 300. The bladder vent plug 300 is an example of a bladder vent plug 100 whose end surface 134 of the body 102 is skew relative to the peripheral body surface 130 to provide a smooth fairing surface against which a composite manufacturing bag may be sealed.

The body 102 of the bladder vent plug 300 comprises two body portions 302, 304 coupled together via fasteners (not illustrated) extending through three fastener bores 306.

The vent passage 106 of the body 102 of the bladder vent plug 300 extends through the peripheral body surface 130 of the body portion 304, and thus is configured to be operatively coupled to a vent fitting associated with a composite manufacturing bag.

The pressure passage 108 of the body 102 of the bladder vent plug 300 also extends through the peripheral body surface 130 of the body portion, and a pressure passage plug 308 is provided to maintain pressure within the pressure passage 108, the pressure bore 116, and the peripheral channel 114 of the manifold block 110.

The diaphragm 118 of the bladder vent plug 300 comprises a sheet of stretchable material that extends across the peripheral channel 114 and that is coupled to the manifold block 110.

Figure 3:
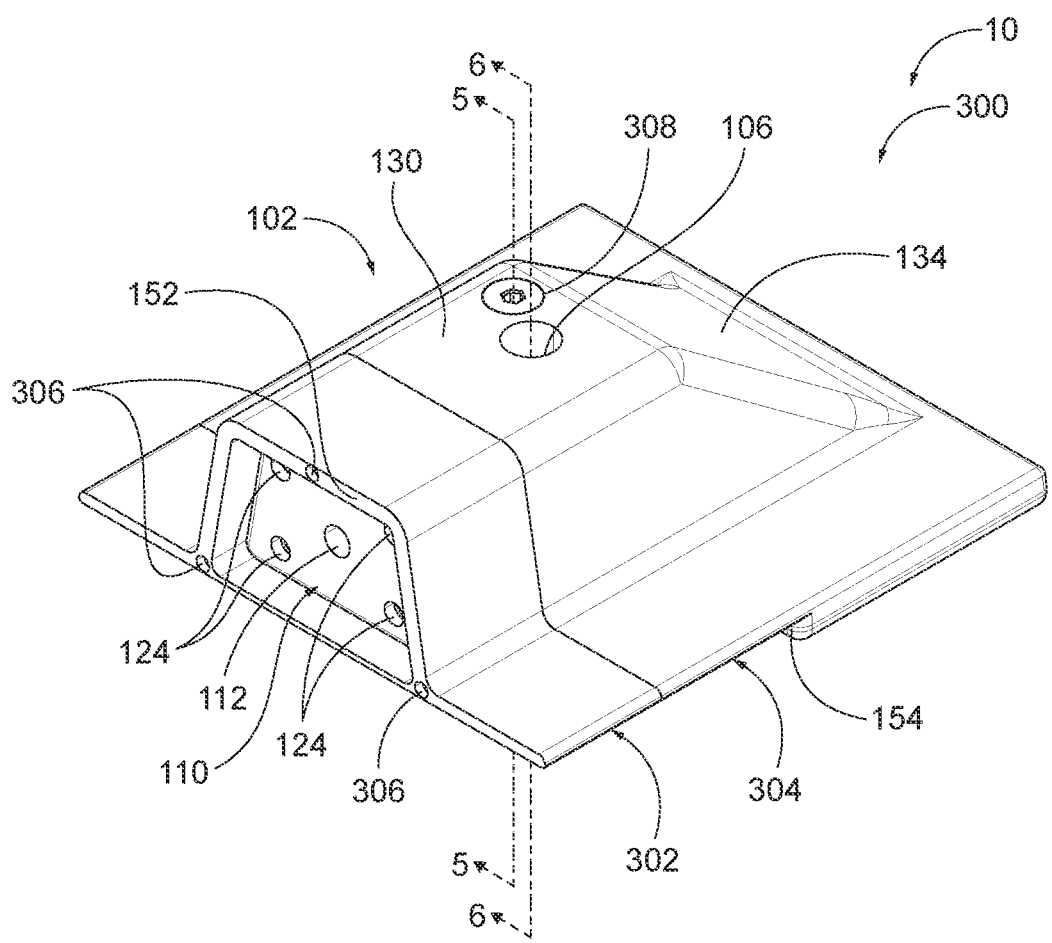
FIG. 3 is an isometric view of an example bladder vent plug according to the present disclosure.
Figure 4:
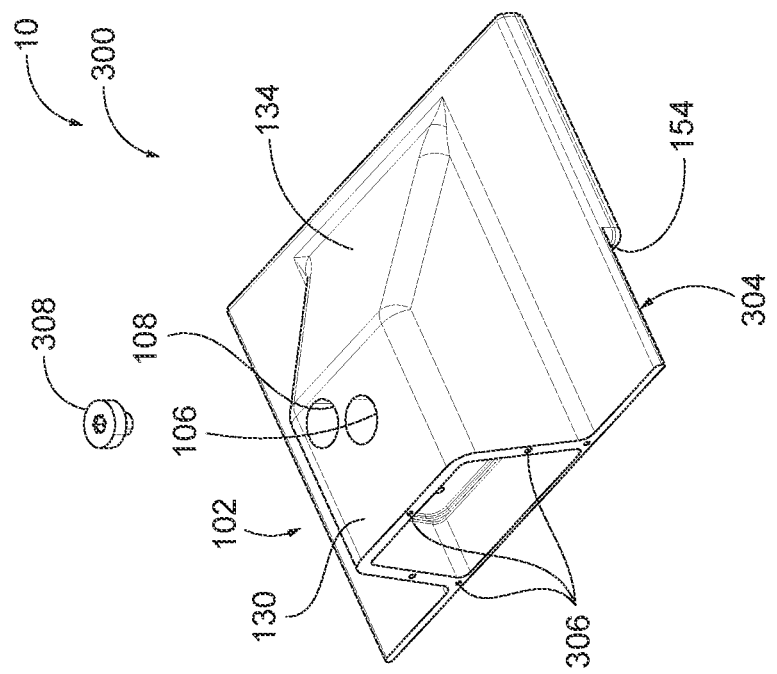
FIG. 4 is an exploded isometric view of the example bladder vent plug of FIG. 3.
Figure 4:
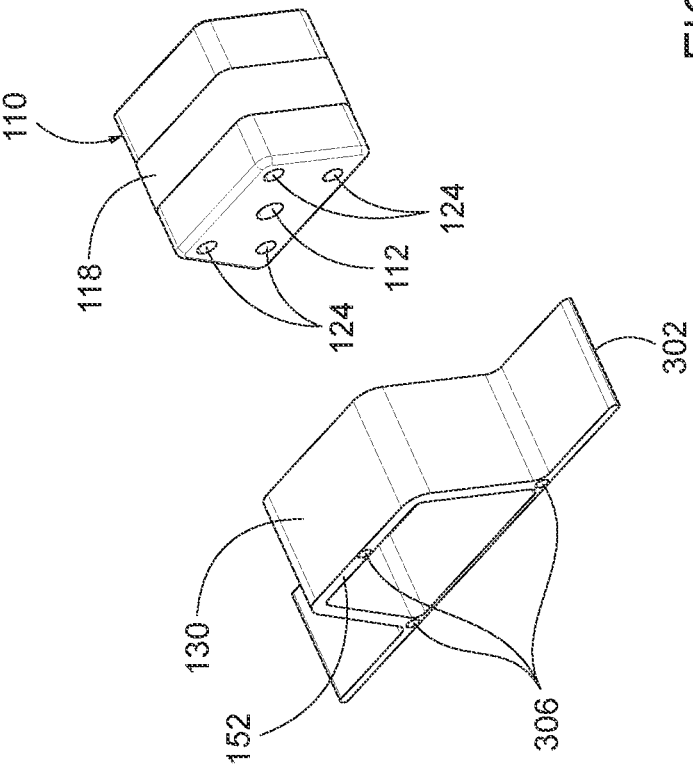
Figure 5:
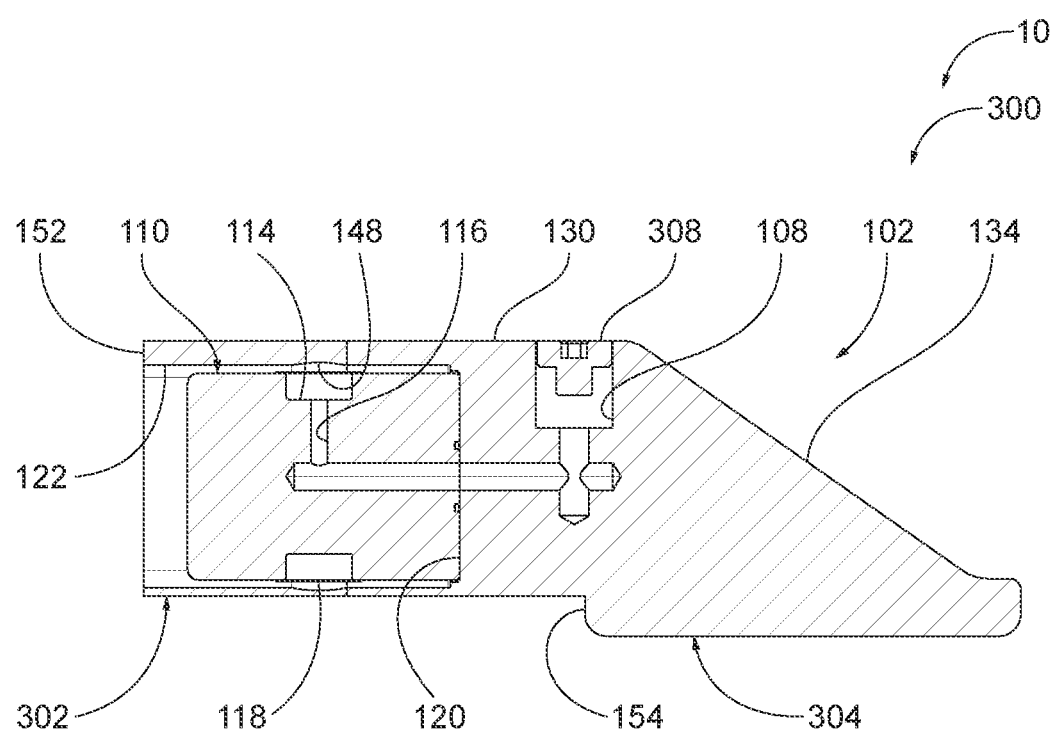
FIG. 5 is a cross-sectional view of the example bladder vent plug of FIG. 3, taken along line 5-5.
Figure 6:
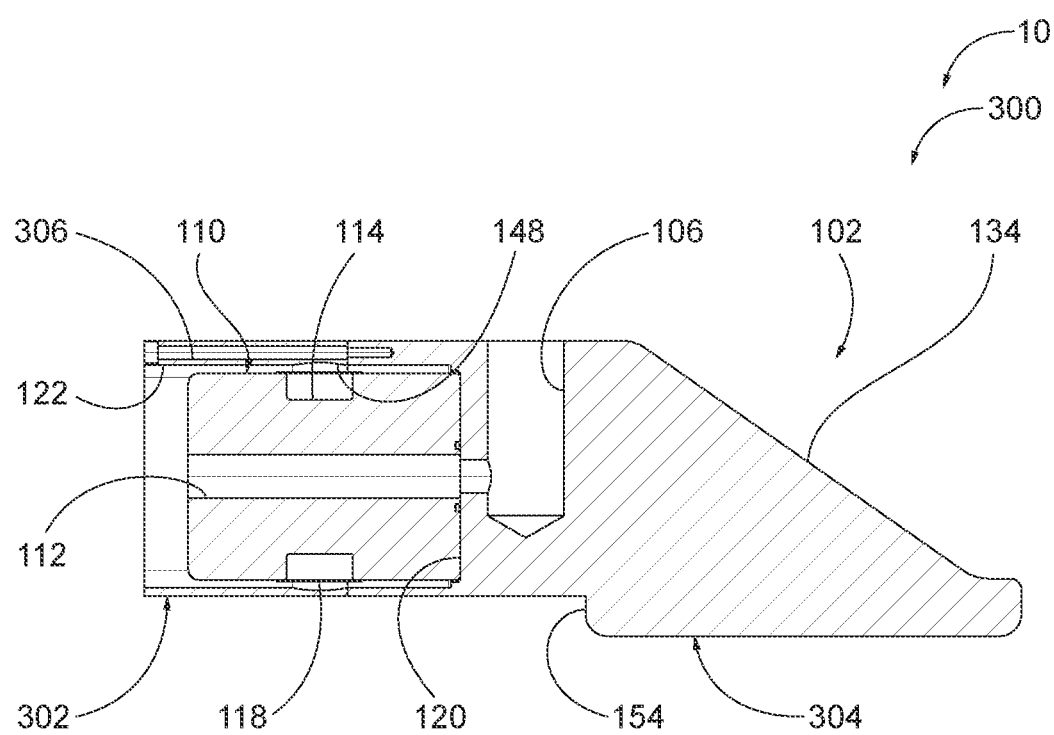
FIG. 6 is a cross-sectional view of the example bladder vent plug of FIG. 3, taken along line 6-6.
Figure 7:
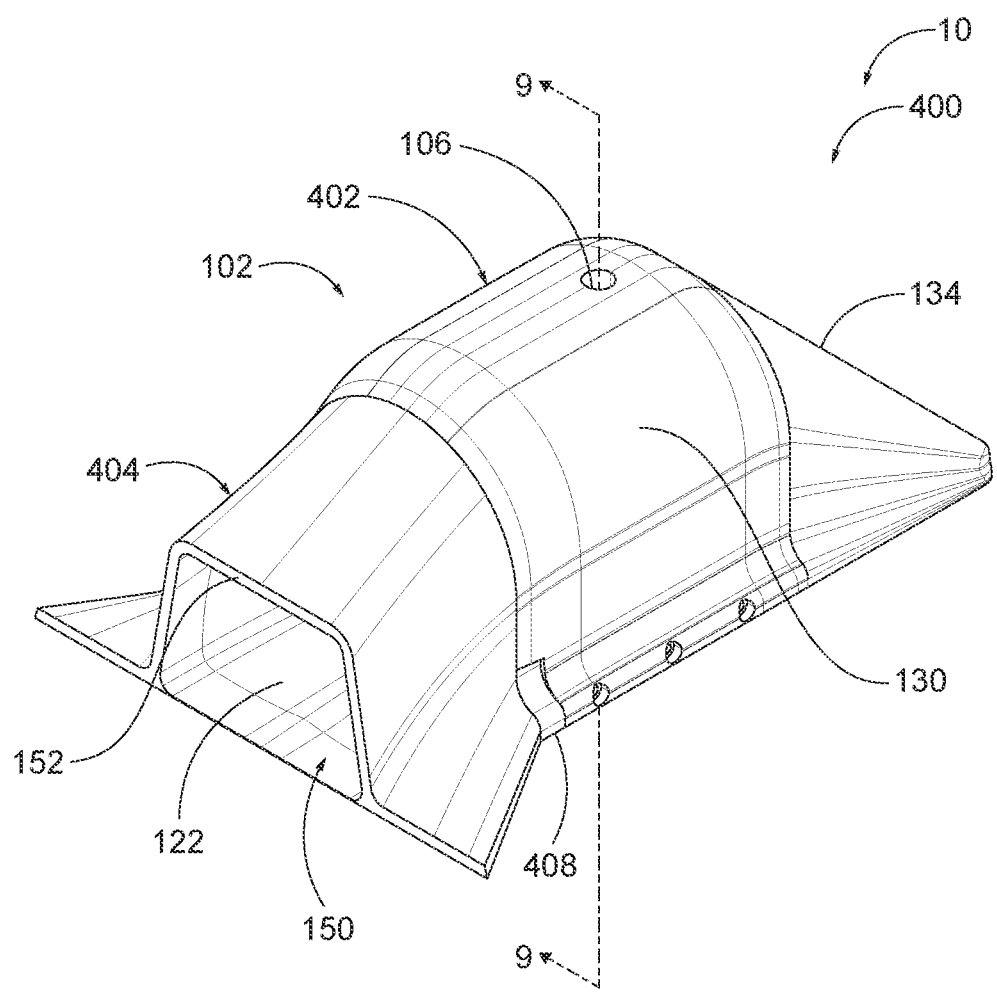
FIG. 7 is an isometric view of another example bladder vent plug according to the present disclosure.
Figure 8:
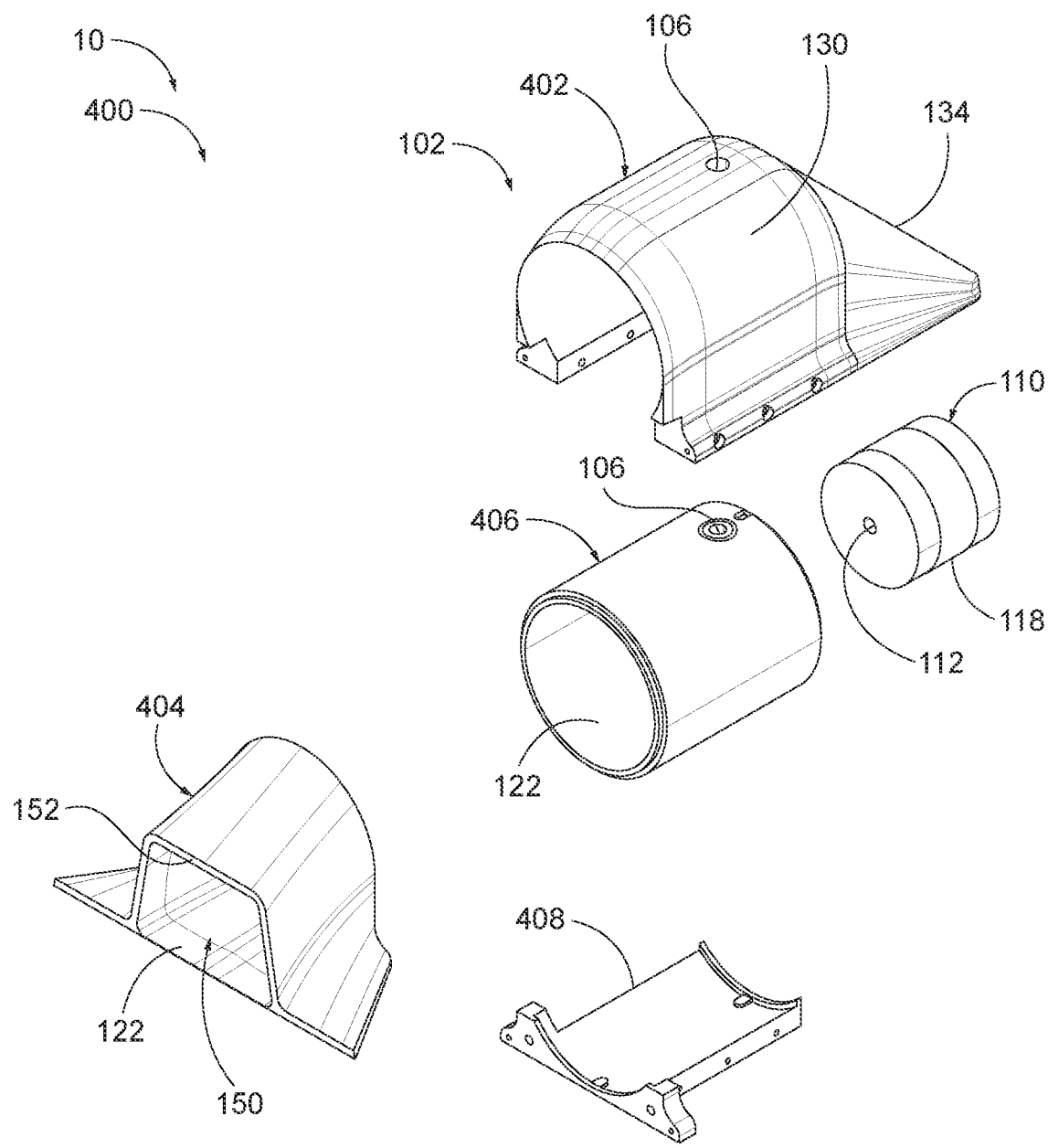
FIG. 8 is an exploded isometric view of the example bladder vent plug of FIG. 7.

As seen in FIGS. 3 and 4, the manifold block 110 defines four manifold-block fastener bores 124. The body portion 304 defines corresponding body fastener bores 126 (not shown) for receipt of associated fasteners to operatively couple the manifold block 110 to the body portion 304.

FIGS. 7-11 illustrate the bladder vent plug 400. The bladder vent plug 400 also is an example of a bladder vent plug 100 whose end surface 134 of the body 102 is skew relative to the peripheral body surface 130 to provide a smooth fairing surface against which a composite manufacturing bag may be sealed.

The body 102 of the bladder vent plug 400 comprises four body portions, including a main body portion 402, a transition-region body portion 404, an internal cylindrical body portion 406, and a lower cap body portion 408. In particular, the transition-region body portion 404 comprises a transition region 150, within which the interior-volume peripheral face 122 of the body 102 transitions from a generally trapezoidal cross-section to a circular cross-section toward the diaphragm engagement portion 148. The internal cylindrical body portion 406 defines the diaphragm engagement portion 148.

Figure 9:
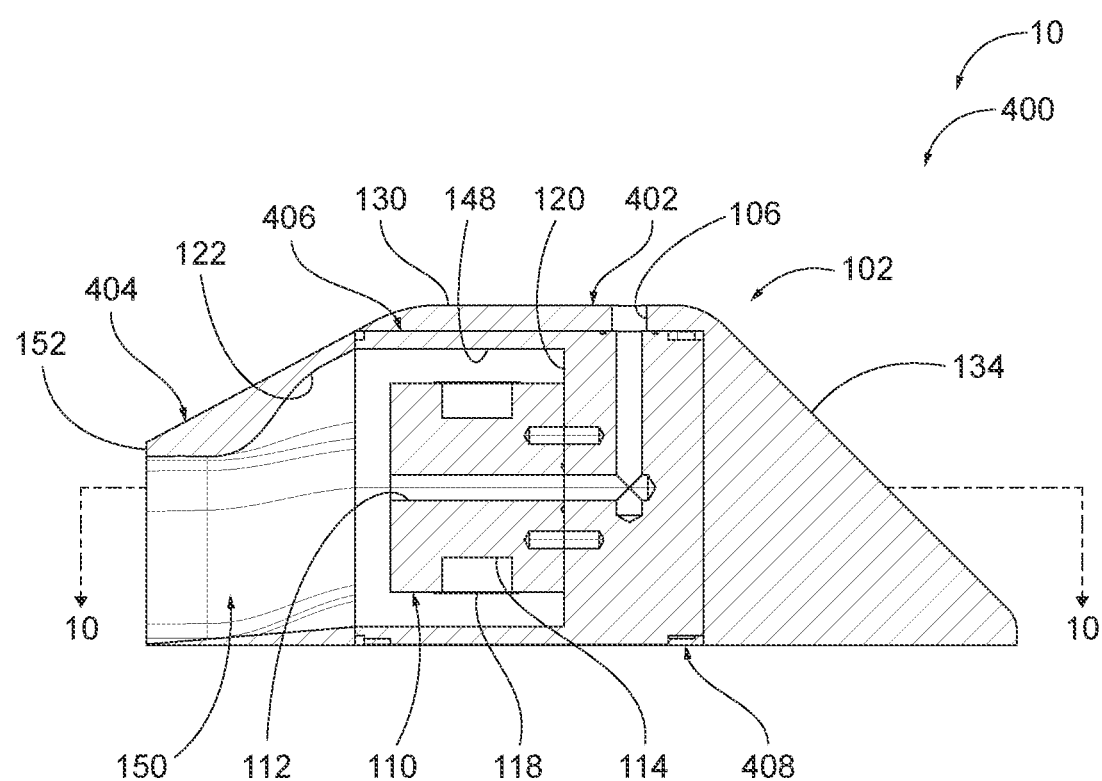
FIG. 9 is a cross-sectional view of the example bladder vent plug of FIG. 7, taken along line 9-9.

As best seen in FIG. 9, the vent passage 106 of the body 102 of the bladder vent plug 400 extends through the internal cylindrical body portion 406 and the main body portion 402, exiting the body 102 at the peripheral body surface 130, and thus is configured to be operatively coupled to a vent fitting associated with a composite manufacturing bag.

Figure 10:
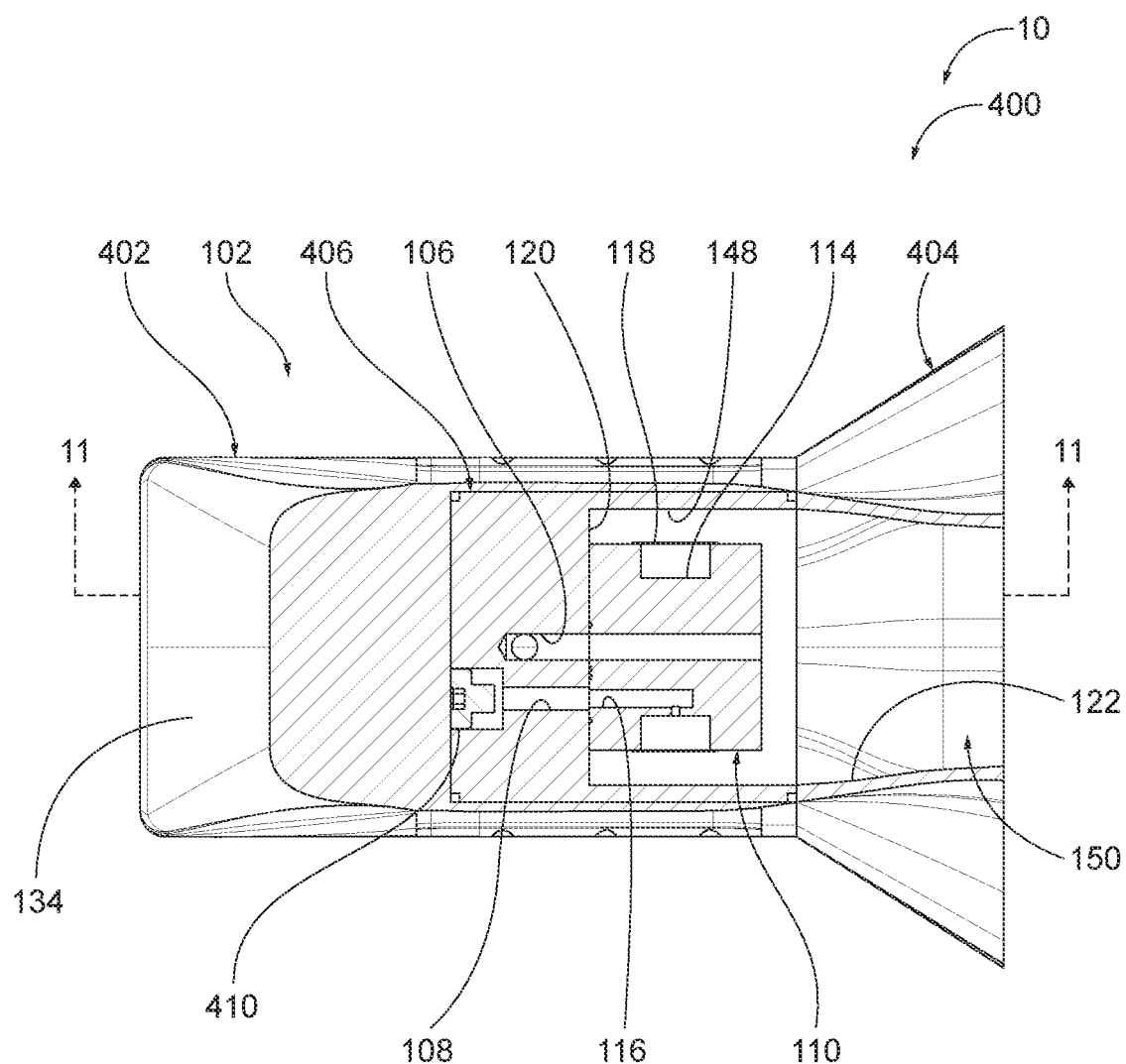
FIG. 10 is a cross-sectional view of the example bladder vent plug of FIG. 7, taken along line 10-10.

As seen in FIG. 10, the pressure passage 108 of the body 102 of the bladder vent plug 400 extends solely through the internal cylindrical body portion 406. Accordingly, to operatively pressurize the diaphragm 118 of the bladder vent plug 400, a pressure source is operatively coupled to the pressure passage 108 prior to the internal cylindrical body portion 406 being coupled between the main body portion 402 and the lower cap body portion 408. That is, a composite manufacturing bladder is first passed through the transition-region body portion 404 into the internal cylindrical body portion 406 and around the manifold block 110. The diaphragm 118 is then pressurized via the pressure passage 108, which is then capped off with a plug 410, prior to the internal cylindrical body portion 406 being coupled to the main body portion 402.

Figure 11:
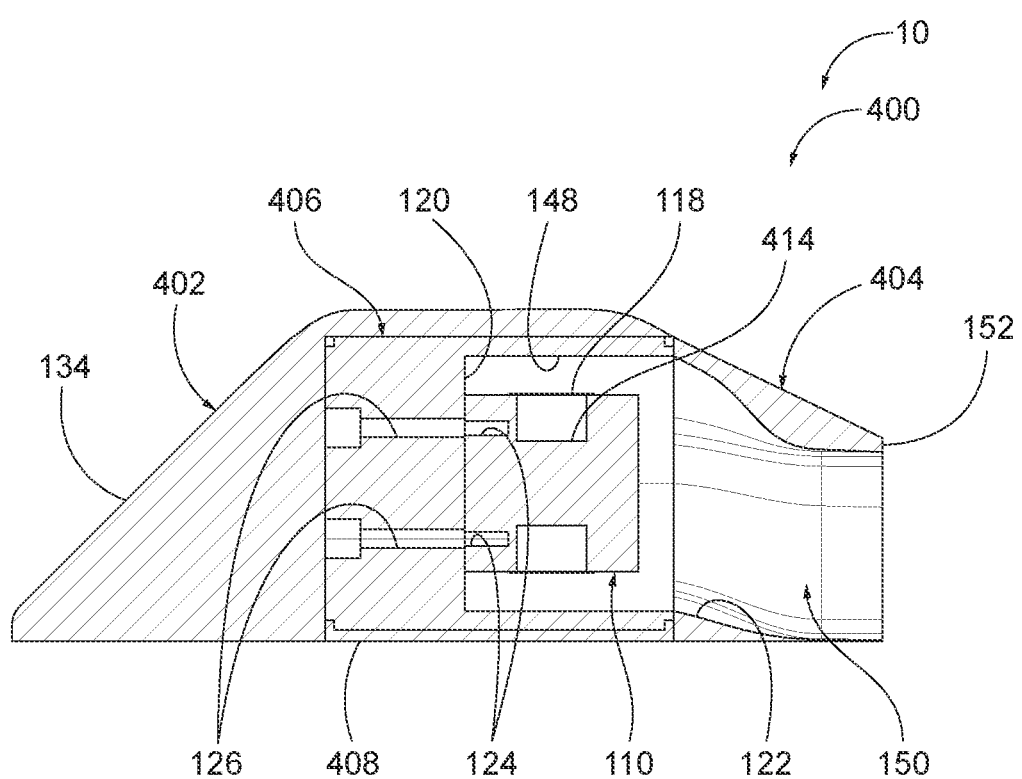
FIG. 11 is a cross-sectional view of the example bladder vent plug of FIG. 7, taken along line 11-11.

As seen in FIG. 11, the manifold block 110 of the bladder vent plug 400 defines manifold-block fastener bores 124, and the internal cylindrical body portion 406 defines corresponding body fastener bores 126 for receipt of associated fasteners to operatively couple the manifold block 110 to the internal cylindrical body portion 406.

Illustrative, non-exclusive examples of inventive subject matter according to the present disclosure are described in the following enumerated paragraphs:

A. A bladder vent plug (100) for composite manufacturing, the bladder vent plug (100) comprising:

a body (102) defining an interior volume (104), defining a vent passage (106) extending through the body (102) from the interior volume (104), and defining a pressure passage (108) extending through the body (102) from the interior volume (104), wherein the body (102) comprises an interior-volume end face (120) and an interior-volume peripheral face (122) that collectively define the interior volume (104), and wherein the vent passage (106) and the pressure passage (108) extend through the interior-volume end face (120);

a manifold block (110) positioned within the interior volume (104) of the body (102), defining a throughbore (112) aligned with the vent passage (106), defining a peripheral channel (114) facing the interior-volume peripheral face (122), and defining a pressure bore (116) aligned with the pressure passage (108) and open to the peripheral channel (114); and a diaphragm (118) operatively positioned relative to the peripheral channel (114), extending fully around the peripheral channel (114), and configured to expand toward the interior-volume peripheral face (122) when the peripheral channel (114) is pressurized via the pressure bore (116) and the pressure passage (108);

wherein the bladder vent plug (100) is configured to receive an open-ended composite-manufacturing bladder (14) between the interior-volume peripheral face (122) and the peripheral channel (114) of the manifold block (110).

A1. The bladder vent plug (100) of paragraph A, wherein the manifold block (110) is fixedly coupled to, or is configured to be fixedly coupled to, the body (102) within the interior volume (104).

A1.1. The bladder vent plug (100) of paragraph A1, wherein the manifold block (110) defines one or more manifold-block fastener bores (124) extending through the manifold block (110);

wherein the body (102) defines one or more body fastener bores (126) extending through the interior-volume end face (120) and aligned with the one or more manifold-block fastener bores (124); and wherein the one or more manifold-block fastener bores (124) and the one or more body fastener bores (126) are configured to receive one or more fasteners (128) to fixedly secure the manifold block (110) to the body (102).

A2. The bladder vent plug (100) of any of paragraphs A-A1.1, wherein the diaphragm (118) defines a tube (119).

A3. The bladder vent plug (100) of any of paragraphs A-A1.1, wherein the diaphragm (118) comprises a sheet of stretchable material extending across the peripheral channel (114) and coupled to the manifold block (110).

A4. The bladder vent plug (100) of any of paragraphs A-A1.1, wherein the peripheral channel (114) comprises a central region (115) and a pair of lateral slots (117) extending into the manifold block (110) from the central region (115); and wherein the diaphragm (118) extends into the pair of lateral slots (117).

A5. The bladder vent plug (100) of any of paragraphs A-A4, wherein the body (102) comprises a peripheral body surface (130) and an end surface (134).

A5.1. The bladder vent plug (100) of paragraph A5, wherein the vent passage (106) extends through the peripheral body surface (130).

A5.2. The bladder vent plug (100) of paragraph A5, wherein the vent passage (106) extends through the end surface (134).

A5.3. The bladder vent plug (100) of any of paragraphs A5-A5.2, wherein the pressure passage (108) extends through the peripheral body surface (130).

A5.4. The bladder vent plug (100) of any of paragraphs A5-A5.2, wherein the pressure passage (108) extends through the end surface (134).

A5.5. The bladder vent plug (100) of any of paragraphs A5-A5.4, wherein the end surface (134) is skew relative to the peripheral body surface (130).

A6. The bladder vent plug (100) of any of paragraphs A-A5.5, wherein the body (102) further defines an access volume (136), and wherein the body (102) comprises an access-volume panel (138) configured to provide selective access to the access volume (136).

A6.1. The bladder vent plug (100) of paragraph A6, wherein the vent passage (106) extends into the access volume (136).

A6.1.1. The bladder vent plug (100) of paragraph A6.1, further comprising a vent-passage connector (140) positioned within the access volume (136), operatively coupled to the vent passage (106), and configured to be selectively and operatively coupled to a separate vent line (142).

A6.2. The bladder vent plug (100) of any of paragraphs A6-A6.1.1, wherein the pressure passage (108) extends into the access volume (136).

A7. The bladder vent plug (100) of any of paragraphs A-A6.2, further comprising a pressure-passage connector (144) operatively coupled to the pressure passage (108) and configured to be selectively and operatively coupled to a pressure source (22) via a pressure line (146).

A7.1. The bladder vent plug (100) of paragraph A7 when depending from paragraph A6, wherein the pressure-passage connector (144) is positioned within the access volume (136).

A8. The bladder vent plug (100) of any of paragraphs A-A7.1, wherein a diaphragm engagement portion (148) of the interior-volume peripheral face (122) toward which the diaphragm (118) is configured to expand is cylindrical.

A8.1. The bladder vent plug (100) of paragraph A8, wherein the body (102) comprises a transition region (150), within which the interior-volume peripheral face (122) transitions from a non-circular cross-section to a circular cross-section from distal the interior-volume end face (120) toward the diaphragm engagement portion (148).

B. A composite manufacturing system (10), comprising:
the bladder vent plug (100) of any of paragraphs A-A8.1;

a layup tool (12);
the open-ended composite-manufacturing bladder (14); and
a composite manufacturing bag (16).

B1. The composite manufacturing system (10) of paragraph B, wherein the layup tool (12) defines a layup-tool vent passage (24) extending through the layup tool (12), and wherein the layup-tool vent passage (24) is configured to be fluidically connected to the vent passage (106) of the bladder vent plug (100).

B2. The composite manufacturing system (10) of paragraph B, wherein the composite manufacturing bag (16) comprises a vent connector (26) configured to be fluidically connected to the vent passage (106) of the bladder vent plug (100).

B3. The composite manufacturing system (10) of any of paragraphs B-B2, wherein the open-ended composite-manufacturing bladder (14) is operatively positioned between the interior-volume peripheral face (122) and the diaphragm (118), optionally wherein the peripheral channel (114) is pressurized and the diaphragm (118) is urging the open-ended composite-manufacturing bladder (14) against the interior-volume peripheral face (122).

B4. The composite manufacturing system (10) of any of paragraphs B-B3, further comprising:
a first composite structure (18) engaged with the layup tool (12); and
a second composite structure (20) engaged with the first composite structure (18);
wherein the first composite structure (18) and the second composite structure (20) define a stringer volume (28);
wherein the open-ended composite-manufacturing bladder (14) is positioned within the stringer volume (28); and
wherein the composite manufacturing bag (16) extends over the first composite structure (18) and the second composite structure (20) and is sealed against the layup tool (12) and optionally against the bladder vent plug (100).

B4.1. The composite manufacturing system (10) of paragraph B4, wherein the second composite structure (20) is a stringer.

C. A composite manufacturing method (200), comprising:
pressurizing (202) a diaphragm (118) to seal an open-ended composite-manufacturing bladder (14) against a bladder vent plug (100).

C1. The composite manufacturing method (200) of paragraph C, further comprising:
prior to the pressurizing (202), positioning (204) the open-ended composite-manufacturing bladder (14) between the diaphragm (118) and a body (102) of the bladder vent plug (100).

C1.1. The composite manufacturing method (200) of paragraph C1, wherein the positioning (204) comprises positioning the open-ended composite-manufacturing bladder (14) between a manifold block (110) of the bladder vent plug (100) and the body (102) of the bladder vent plug (100).

C1.1.1. The composite manufacturing method (200) of any of paragraphs C1-C1.1, wherein the positioning (204) further comprises assembling the body (102) of the bladder vent plug (100) around a/the manifold block (110) of the bladder vent plug (100).

C2. The composite manufacturing method (200) of any of paragraphs C-C1.1.1, further comprising:
prior to the pressurizing (202), positioning (206) the open-ended composite-manufacturing bladder (14) between a first composite structure (18) and a second composite structure (20) relative to a layup tool (12); and
sealing (208) a composite manufacturing bag (16) over the first composite structure (18) and the second composite structure (20) against the layup tool (12).

C2.1. The composite manufacturing method (200) of paragraph C2, further comprising, following the sealing (208):
applying (210) a vacuum to the first composite structure (18) and the second composite structure (20) while maintaining (212) fluid communication between an internal volume of the open-ended composite-manufacturing bladder (14) and an environment outside of the vacuum.

C2.1.1. The composite manufacturing method (200) of paragraph C2.1, further comprising following the applying (208):
depressurizing (214) the diaphragm (118); and
removing (216) the open-ended composite-manufacturing bladder (14) from between the diaphragm (118) and the bladder vent plug (100).

C3. The composite manufacturing method (200) of any of paragraphs C-C2.1.1, wherein the bladder vent plug (100) is the bladder vent plug (100) of any of paragraphs A-A8.1.

D. Use of the bladder vent plug (100) of any of paragraphs A-A8.1 to manufacture a composite structure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A bladder vent plug for composite manufacturing, the bladder vent plug comprising:
    a body defining an interior volume, defining a vent passage extending through the body from the interior volume, and defining a pressure passage extending through the body from the interior volume, wherein the body comprises an interior-volume end face and an interior-volume peripheral face that collectively define the interior volume, and wherein the vent passage and the pressure passage extend through the interior-volume end face;
    a manifold block positioned within the interior volume of the body, defining a throughbore aligned with the vent passage, defining a peripheral channel facing the interior-volume peripheral face, and defining a pressure bore aligned with the pressure passage and open to the peripheral channel; and
    a diaphragm operatively positioned relative to the peripheral channel, extending fully around the peripheral channel, and configured to expand toward the interior-volume peripheral face when the peripheral channel is pressurized via the pressure bore and the pressure passage;
    wherein the bladder vent plug is configured to receive an open-ended composite-manufacturing bladder between the interior-volume peripheral face and the peripheral channel of the manifold block.

2. The bladder vent plug of claim 1, wherein the manifold block is configured to be fixedly coupled to the body within the interior volume.

3. The bladder vent plug of claim 2,
    wherein the manifold block defines one or more manifold-block fastener bores extending through the manifold block;
    wherein the body defines one or more body fastener bores extending through the interior-volume end face and aligned with the one or more manifold-block fastener bores; and
    wherein the one or more manifold-block fastener bores and the one or more body fastener bores are configured to receive one or more fasteners to fixedly secure the manifold block to the body.

4. The bladder vent plug of claim 1, wherein the diaphragm defines a tube.

5. The bladder vent plug of claim 1, wherein the diaphragm comprises a sheet of stretchable material extending across the peripheral channel and coupled to the manifold block.

6. The bladder vent plug of claim 1,
    wherein the peripheral channel comprises a central region and a pair of lateral slots extending into the manifold block from the central region; and
    wherein the diaphragm extends into the pair of lateral slots.

7. The bladder vent plug of claim 1,
    wherein the body comprises a peripheral body surface and an end surface; and
    wherein the vent passage extends through the peripheral body surface.

8. The bladder vent plug of claim 1,
    wherein the body comprises a peripheral body surface and an end surface; and
    wherein the vent passage extends through the end surface.

9. The bladder vent plug of claim 1,
    wherein the body comprises a peripheral body surface and an end surface; and
    wherein the pressure passage extends through the peripheral body surface.

10. The bladder vent plug of claim 1,
    wherein the body comprises a peripheral body surface and an end surface; and
    wherein the pressure passage extends through the end surface.

11. The bladder vent plug of claim 1,
    wherein the body comprises a peripheral body surface and an end surface; and
    wherein the end surface is skew relative to the peripheral body surface.

12. The bladder vent plug of claim 1, wherein the body further defines an access volume, wherein the body comprises an access-volume panel configured to provide selective access to the access volume, and wherein the vent passage extends into the access volume.

13. The bladder vent plug of claim 1, wherein the body further defines an access volume, wherein the body comprises an access-volume panel configured to provide selective access to the access volume, and wherein the pressure passage extends into the access volume.

14. The bladder vent plug of claim 1, further comprising a pressure-passage connector operatively coupled to the pressure passage and configured to be selectively and operatively coupled to a pressure source via a pressure line.

15. The bladder vent plug of claim 1, wherein a diaphragm engagement portion of the interior-volume peripheral face toward which the diaphragm is configured to expand is cylindrical.

16. The bladder vent plug of claim 15, wherein the body comprises a transition region, within which the interior-volume peripheral face transitions from a non-circular cross-section to a circular cross-section from distal the interior-volume end face toward the diaphragm engagement portion.

17. A composite manufacturing system, comprising:
    the bladder vent plug of claim 1;
    a layup tool;
    the open-ended composite-manufacturing bladder; and
    a composite manufacturing bag.

18. The composite manufacturing system of claim 17, wherein the layup tool defines a layup-tool vent passage extending through the layup tool, and wherein the layup-tool vent passage is configured to be fluidically connected to the vent passage of the bladder vent plug.

19. The composite manufacturing system of claim 17, wherein the composite manufacturing bag comprises a vent connector configured to be fluidically connected to the vent passage of the bladder vent plug.

20. The composite manufacturing system of claim 17, further comprising:
    a first composite structure engaged with the layup tool; and
    a second composite structure engaged with the first composite structure;

wherein the first composite structure and the second composite structure define a stringer volume;

wherein the open-ended composite-manufacturing bladder is positioned within the stringer volume;

wherein the open-ended composite-manufacturing bladder is operatively positioned between the interior-volume peripheral face and the diaphragm;

wherein the peripheral channel is pressurized and the diaphragm is urging the open-ended composite-manufacturing bladder against the interior-volume peripheral face; and wherein the composite manufacturing bag extends over the first composite structure and the second composite structure and is sealed against the layup tool.

21. A method of utilizing the bladder vent plug of claim 1, the method comprising:

pressurizing the diaphragm to seal the open-ended composite-manufacturing bladder against the bladder vent plug.

* * * * *